(Model.)
W. P. BROWN.
Plow Attachment.
No. 238,846.          Patented March 15, 1881.
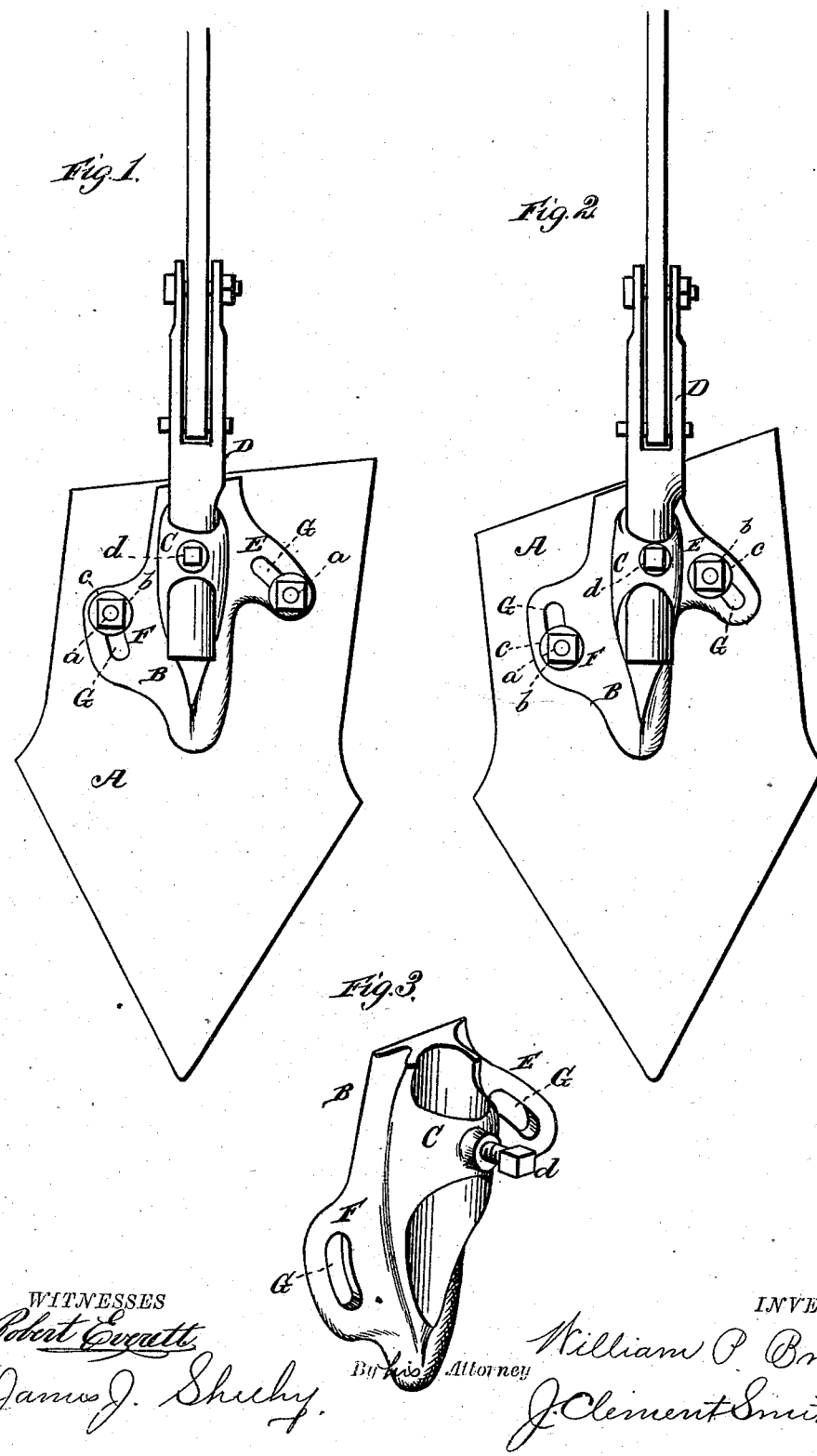
WITNESSES
Robert Everett
James J. Sheehy
INVENTOR
William P. Brown
J. Clement Smith
By his Attorney

UNITED STATES PATENT OFFICE.

WILLIAM P. BROWN, OF ZANESVILLE, OHIO.

PLOW ATTACHMENT.

SPECIFICATION forming part of Letters Patent No. 238,846, dated March 15, 1881.

Application filed September 3, 1880. (Model.)

*To all whom it may concern:*

Be it known that I, WILLIAM P. BROWN, a citizen of the United States, resident at Zanesville, in the county of Muskingum and State of Ohio, have invented certain new and useful Improvements in Plow Attachments; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention has relation to plow attachments; and it consists of the features of construction and combination hereinafter fully described, and particularly pointed out in the claim.

Figure 1 is a rear view, showing the share adjusted to the right on the slotted plate or bracket. Fig. 2 is a similar view, showing share adjusted to the left, a central position being the normal position; and Fig. 3 is a detail perspective of the slotted plate or bracket provided with the socket for the foot of the plow-standard.

The object I aim to attain is to admit of a change of location, or position rather, of the plowshare on its standard, in order to throw either more dirt or less dirt toward the plant under cultivation than will be thrown by the same share when in a normal position, and at the same time, by an adjustment of the bracket on the standard, maintain the point of the share directly in front of the standard, as will hereinafter more fully appear.

Referring by letter to the drawings, A designates the ordinary shovel or share employed in plows and cultivators, provided with bolt-holes, and bolts, nuts, and washers of the ordinary construction are employed to secure it to its bracket or plate B. The plate B is provided with a socket, C, and set-screw, which are also known and used, and the standard D fits this socket and operates as heretofore. The bracket or plate B has an upper wing, E, and a lower wing, F, on opposite sides of the socket C, and these wings are each provided with a curved slot, G, through which the bolts *a a* are passed and secured by the nuts and washers *b c*.

When the socket C is straight upon the standard the set-screw *d* is directly in the rear of the same, and if the point of the share A is directly in line with the standard D the share is in its normal position and will throw the dirt evenly on both sides of the plow. If, now, it be desired to increase the quantity of dirt to be thrown toward the plants or to lessen the quantity compared with that thrown in that direction while the plow was in its normal position, the nuts should be loosened and the share shifted, the point in one direction and the top in the other, as it turns as if on a pivot, except that it slides and maintains the top always at the same height after the bracket has been adjusted on the standard. After the share has been turned to move the point either to the right or left the nuts should be tightened to hold it. After this adjustment the point of the share will have been moved away from its normal center, and the socket should be turned on the standard to bring the point in direct line with the standard. It will therefore be seen that by means of this bracket, in connection with the socket and standard, the share can be adjusted to throw a greater or lesser quantity of dirt toward the plants, and the point of the share can be always maintained in a direct line with the standard, so that it will enter the ground properly, always being in the line of the draft.

Having thus fully described my invention, what I claim as new, and desire to secure by Letters Patent of the United States, is—

In a plow attachment, the plate B, having upper wing, E, and lower wing, F, provided with curved slots G, and located upon opposite sides of a socket, C, having set-screw *d*, in combination with the pointed shovel A, bolts *a*, nuts *b*, and the rounded plow-standard D, constructed and operating substantially as and for the purposes set forth.

In testimony whereof I affix my signature in presence of two witnesses.

WILLIAM P. BROWN.

Witnesses:
I. BARTAM,
CHARLIE MINER.